United States Patent [19]
Fredlund et al.

[11] Patent Number: 6,111,950
[45] Date of Patent: *Aug. 29, 2000

[54] METHOD, APPARATUS AND MEDIUM FOR DELIVERING A PROCESSING APPLICATION LINKED TO DATA TO BE PROCESSED

[75] Inventors: John R. Fredlund; Joseph Anthony Manico, both of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/407,539

[22] Filed: Mar. 20, 1995

[51] Int. Cl.⁷ ............................... H04L 9/00; H04K 1/00
[52] U.S. Cl. .................................. 380/23; 380/4; 380/25
[58] Field of Search ................................ 380/3, 4, 23, 25

[56] References Cited

U.S. PATENT DOCUMENTS

| | | |
|---|---|---|
| 4,616,327 | 10/1986 | Rosewarne et al. . |
| 5,036,472 | 7/1991 | Buckley et al. . |
| 5,056,029 | 10/1991 | Cannon . |
| 5,146,553 | 9/1992 | Noguchi et al. . |
| 5,343,527 | 8/1994 | Moore .......................................... 380/4 |
| 5,450,489 | 9/1995 | Ostrover et al. ............................. 380/3 |
| 5,457,746 | 10/1995 | Dolphin ....................................... 380/4 |
| 5,460,374 | 10/1995 | Owaki ...................................... 273/148 |
| 5,494,445 | 2/1996 | Sekiguchi et al. . |

OTHER PUBLICATIONS

The New Papyrus, Brian Martin, "The CD ROM Publication", pp. 429–433.

"The Seattle Filmworks Preferred Customer Newsletter", Spring 1994, vol. 5, No. 1.

*Primary Examiner*—Gail O. Hayes
*Assistant Examiner*—Hrayr A. Sayadian
*Attorney, Agent, or Firm*—Peyton C. Watkins

[57] ABSTRACT

An apparatus and method that stores image data on a disk along with an application program that operates on those images. The application program is limited to interacting with only the images on the disk. This interaction limitation is accomplished by creating a unique signature for each image from the data of the image and including that signature in the application. Prior to executing image processing operations on any retrieved image the application checks the signature of the image with the signature in the application and if there is not a match the application program is disabled.

7 Claims, 8 Drawing Sheets

METHOD, APPARATUS AND MEDIUM FOR DELIVERING A PROCESSING APPLICATION LINKED TO DATA TO BE PROCESSED

BACKGROUND OF THE INVENTION

1. Field of the Invention

The present invention is directed to a system that provides an application program for processing data on the same media as the data to be processed and, more particularly, to a system that provides the application program and data on a media and linked in such a way that the application program can only be used with the data provided therewith and where the application program is an image processing program that performs image modification as well as other functions and the data comprises images that can be personal images of the user.

2. Description of the Related Art

Many conventional means exist to transform analog images into digital files representative of those images. Additionally, when these images are converted to digital files, there are many storage means on which these image files can be stored. Among these are floppy magnetic disks, hard magnetic disk drives, optical ROM disks such as CD's, optical/magnetic read/write disks, and digital tape. In situations where images, such as personal images, are digitized by a service provider, such as a local photo shop or film processing company, the user or customer of the service can deliver images to the provider, and will receive the image files on one of the previously mentioned storage means. The Photo CD™ system is an example of one such conventional image delivery system. In addition to using a service to provide the images or place personal images on the storage media, the customer may also purchase software programs or applications which will operate on these images. These applications allow the customer to access, view, modify, and/or print the image files as desired. Adobe Photoshop™ is an example of such a conventional application. FIG. 1 illustrates this situation where the application is provided on one storage means, such as disk 10, and the images are provided on another storage means, such as another disk 12. Since the application and image file are used together to provide the desired result, there may be an advantage in providing both on the same storage and delivery means such as the disk 14 illustrated in FIG. 2. Seattle Film Works (SFW) provides a magnetic disk with both personal images and an application stored thereon called PhotoWorks™. The application allows photographic images or pictures stored on the disk to be viewed using a typical home computer. However, as illustrated in FIG. 3, this type system allows the computer 18, and the application running thereon, to not only accept the images on the source medium 20 but will allow the images to be provided on any other medium 22. This allows a situation, such as illustrated in FIG. 4, to exist where the computer 18 will not only accept a storage medium 14 including the application and the images but also images from other media 24. Further, due to the expense or cost of most applications which allow image viewing, modification and printing, it is not practically feasible to deliver such applications along with the image files created for personal use of a particular customer. Applications such as Photoshop™ are delivered to customers with sample image files, but these same files are not the personal property of the customer, and the same image files are delivered to many purchasers of the application. As a result, the supplier which supplies both applications and images is confronted with deciding to provide applications that are very costly and that can be used with any image, supplying only images or supplying both the application and the images. Typical consumers do not want to pay for the expensive full featured versions of the applications but would like to use some of the features of such applications particularly on their personal images that are being provided on the media.

What is needed is a system including a media for delivering images and an application that can operates on those images such that the application will only operate with the images provided on the media, thereby providing the consumer with the application limited to the needs of the user and at low cost.

SUMMARY OF THE INVENTION

It is an object of the present invention to provide an application distribution medium that includes not only the application program but also the data on which the application operates.

It is another object of the present invention to provide a medium that includes an application and the data which the application uses such that the application can only operate on the data which is included on the medium.

It is also an object of the present invention to provide a disk that includes images and an application that operates only on the images stored on the disk.

It is another object of the present invention to provide an automatic and limited/controlled license to a particular image processing application.

It is still another object of the present invention to provide an application that can modify only images provided on the same medium as the application.

A further object of the present invention is to provide a user with the ability to create script files allowing substantially immediate return to an edited condition so that the user can continue with an editing session even when an edited image cannot be input and processed.

It is an additional object of the present invention to provide an application that is enabled only for use with the user's personal images or which have been selected for the user.

The above objects can be attained by a system that stores image data on a disk along with an application process that operates on those images. The application is limited to interacting with only the images on the disk. This interaction limitation can be accomplished by including in or with the images a unique identifier or signature that identifies that a particular image is one that can be processed by the application. This signature can be created from the image and stored as a constant in the application or can be an arrangement of bits embedded within the image data that are set to specific values. The location of the bits can be fixed or random or controlled by an algorithm. The application checks the signature of any new image before proceeding to process the image. When the application and images are loaded onto the disk the identifiers are created and stored within the application.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
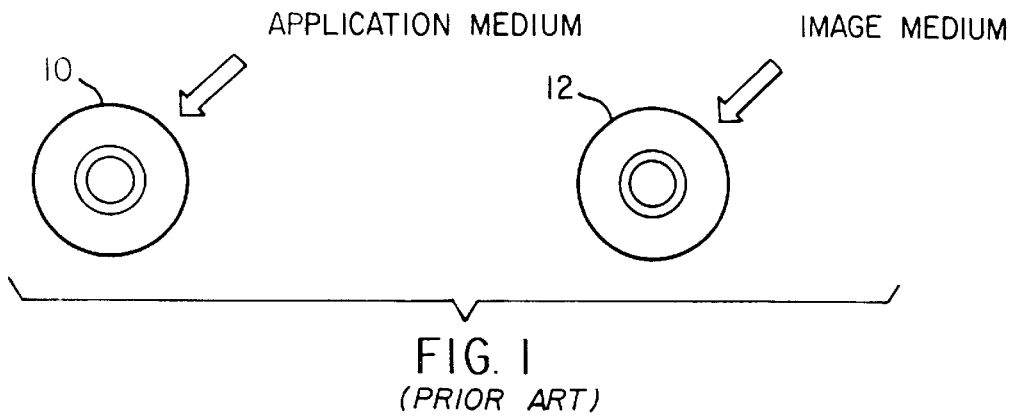
FIG. 1 illustrates a typical situation where applications and images are provided to a user.
Figure 2:
FIG. 2 illustrates another way of providing applications and images.
Figure 3:
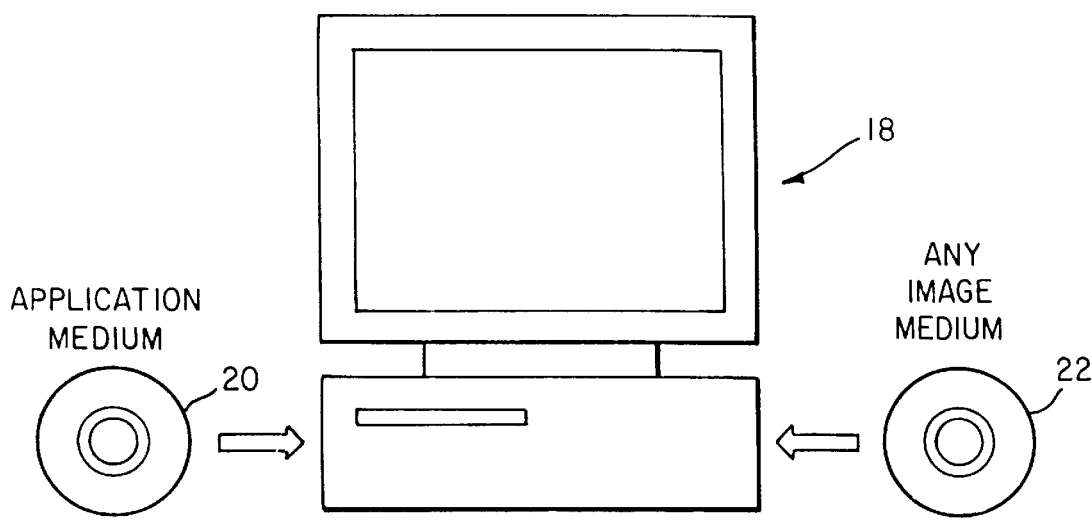
FIGS. 3 and 4 depict the consequences of the methods of FIGS. 1 and 2.
Figure 4:
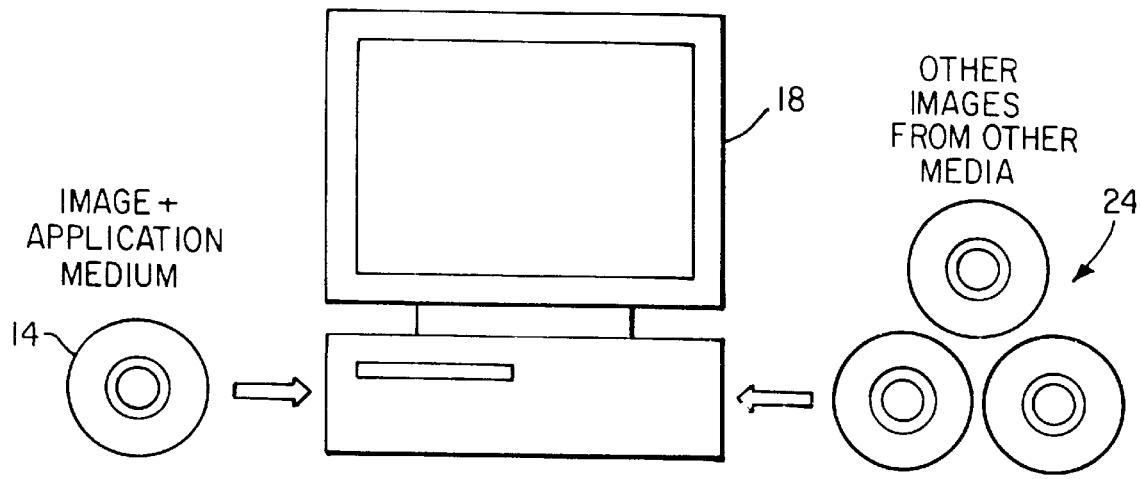
Figure 5:
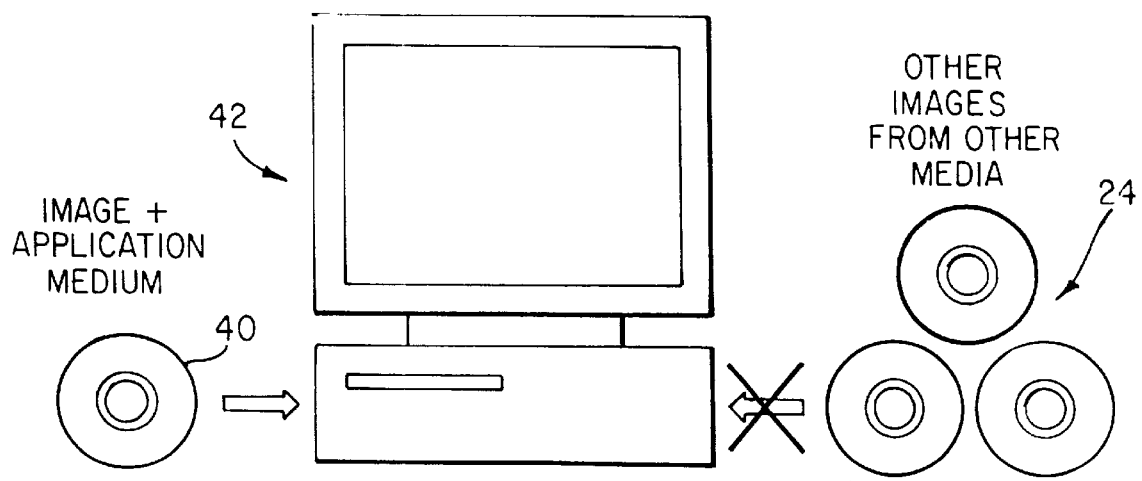
FIG. 5 illustrates that the present invention blocks the use of other images with the application of the media 40.

The present invention, as illustrated in FIG. 5, is designed to provide a media, such as disk 40 like a conventional magnetic disk or a conventional optical CD, to a user that can be loaded into a computer system 42, such as a MacIntosh Performa™, that is capable of performing applications, processes or programs that can process images. The disk 40 includes image data in a conventional format and which can include images personal to the user, such as recent snapshots, or images that are popular among consumers. The disk 40 also includes a conventional application, such as the PhotoEdge™ application from Kodak that allows the user to retrieve, modify, cut, paste, etc. the images such that modified images pleasing to the user are produced. The application can also allow the user to print the original or modified images on a conventional color printer (not shown) associated with the computer system 42. However, the application will not access or otherwise operate with images other than those on the original disk 40 no matter the source as illustrated by the "x" in FIG. 5. This is accomplished by including within each of the original images on the disk 40 an image identifier or unique signature for each image that the application checks before the image can be processed. When the identifier stored in the application does not match the identifier of the image, the application will not execute the processing operations on or with respect to the image.

Figure 6:
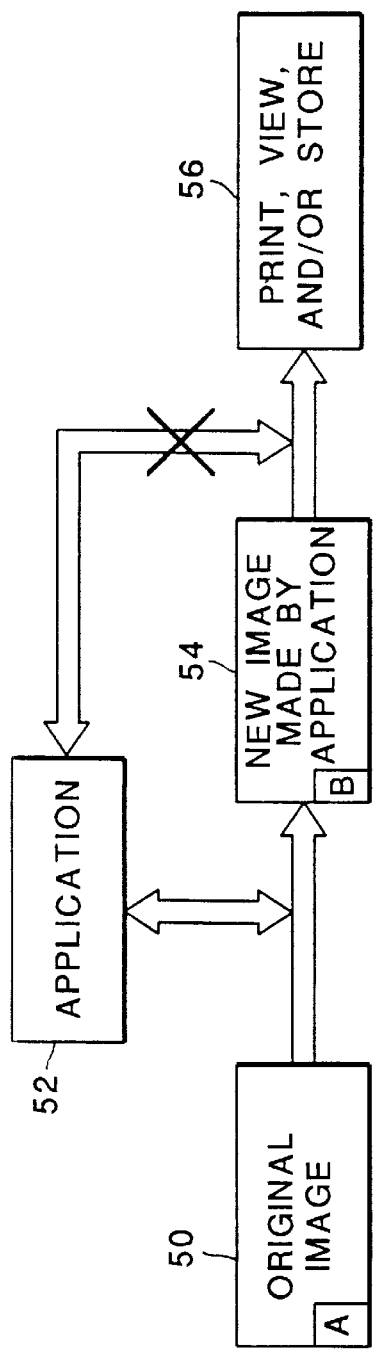
FIG. 6 illustrates blocking use of modified original images with the application.

This restriction also applies to the modified images that are produced by the user executing the application with the original images, as illustrated in FIG. 6. An original image 50 can be accessed and modified by the application 52 to produce a new or modified image 54 that can then be printed, viewed or stored 56. However, the modified image, once it is output or is removed from the random access memory of the computer in any way, will not be processed by the application as indicated by the "x" through the path to the application by the modified image 54. That is, each time an image is loaded into the memory of the computer 52, the application checks to determine whether the image includes a recognized signature.

Figure 7:
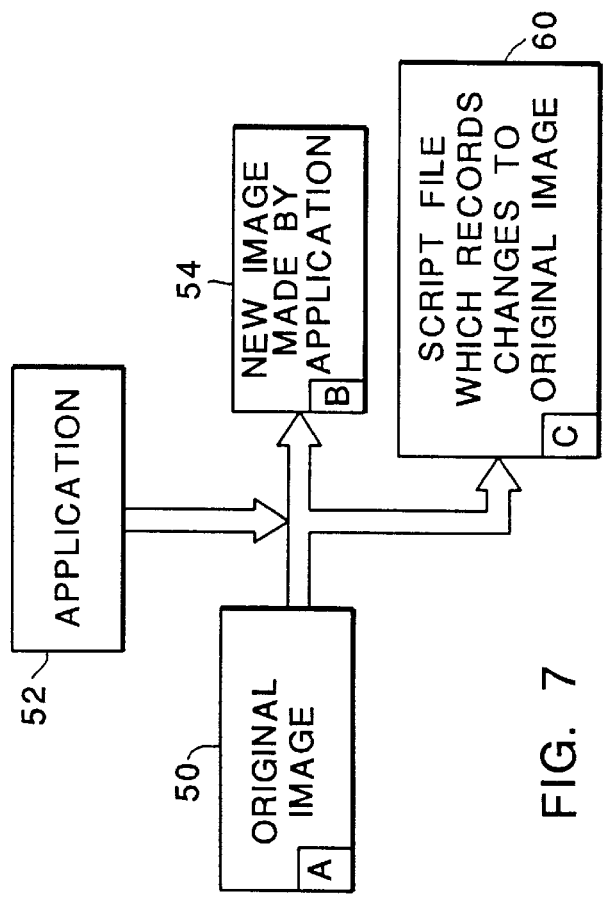
FIG. 7 illustrates making a script for the modifications creating a modified original image.
Figure 8:
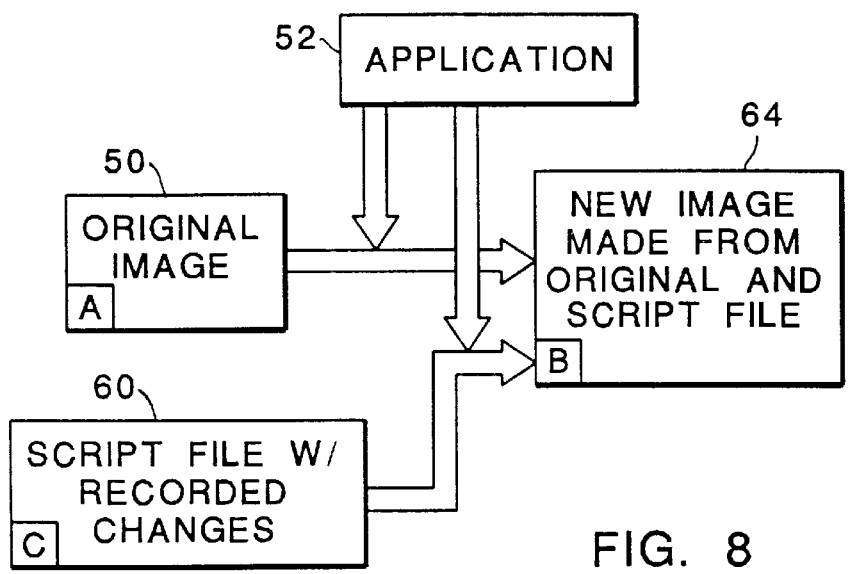
FIG. 8 illustrates recreating the modified image with the script.

Since this restriction applies to the image access or retrieval operation as well as the operations for modifying the image, if a modified image is stored and the application is subsequently used in an attempt to retrieve the modified image the retrieval operation will be blocked. This can be a particular problem for users who make changes to an image, print the modified image and later decide that additional changes need to be made. It can also be a problem when the user wants a custom high resolution enlargement of the modified image to be printed by the supplier or service provider and does not wish to store the entire modified image for printing by the service provider. To prevent this limitation from preventing the restricted application 52 from further operating on a modified image 54, the present invention includes the creation and storage of a conventional key stroke or script file 60, as illustrated in FIG. 7, which records all the commands executed by the user in creating the modified image 54. This script file 54 is then used by the application 52, which would include a conventional script interpreter to recreate the modified image 64 from the original image 50, as illustrated in FIG. 8, and, because the image 64 is resident within the RAM of the computer 42, allows the user to continue with further modifications to the original image 50 beyond those of the script file 54. Of course the script file for this further modified original image can be stored so that additional modifications can be made. The script file 60 can also be provided to the media supplier which can then use the script to make custom enlargements, etc.

Figure 9:
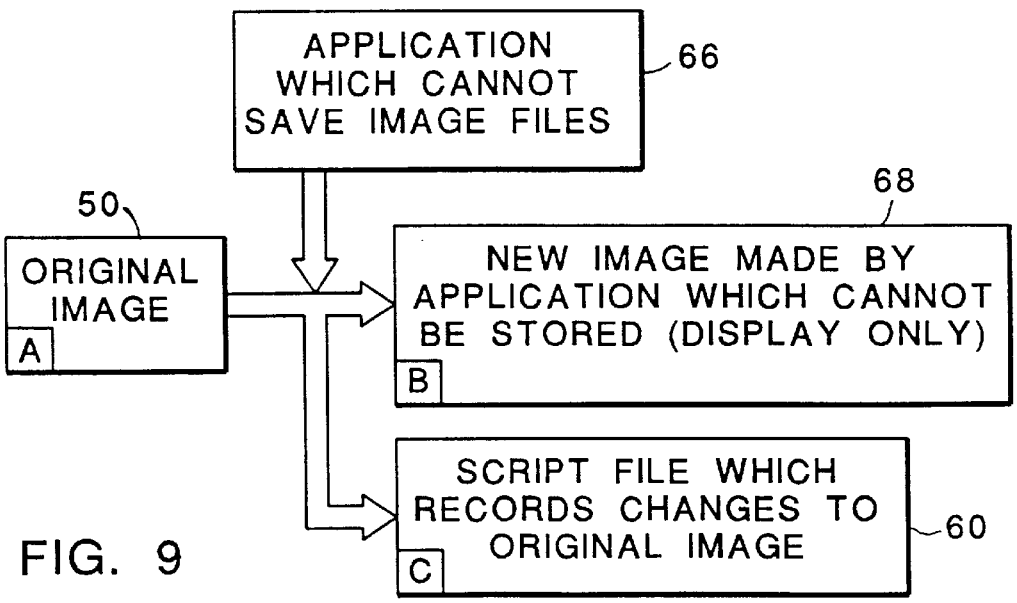
FIG. 9 illustrates limitations on the processes which the application will perform.

FIG. 9 illustrates an application 66 and a modified image 68 which is modified by the application 66 where the application 66 has been restricted so that save and print operations on images cannot be performed. As a result modified images can be only displayed and cannot be stored. The script file 60 created when using the application 66 allows the modified image to be recreated as desired by the user without having to go through the original operations that created the modified image 66 from the original 50. The script file 60 in this situation can also be provided to a print shop which can then duplicate the modifications and provide a print, slide, etc. as desired by the user.

Figure 10:
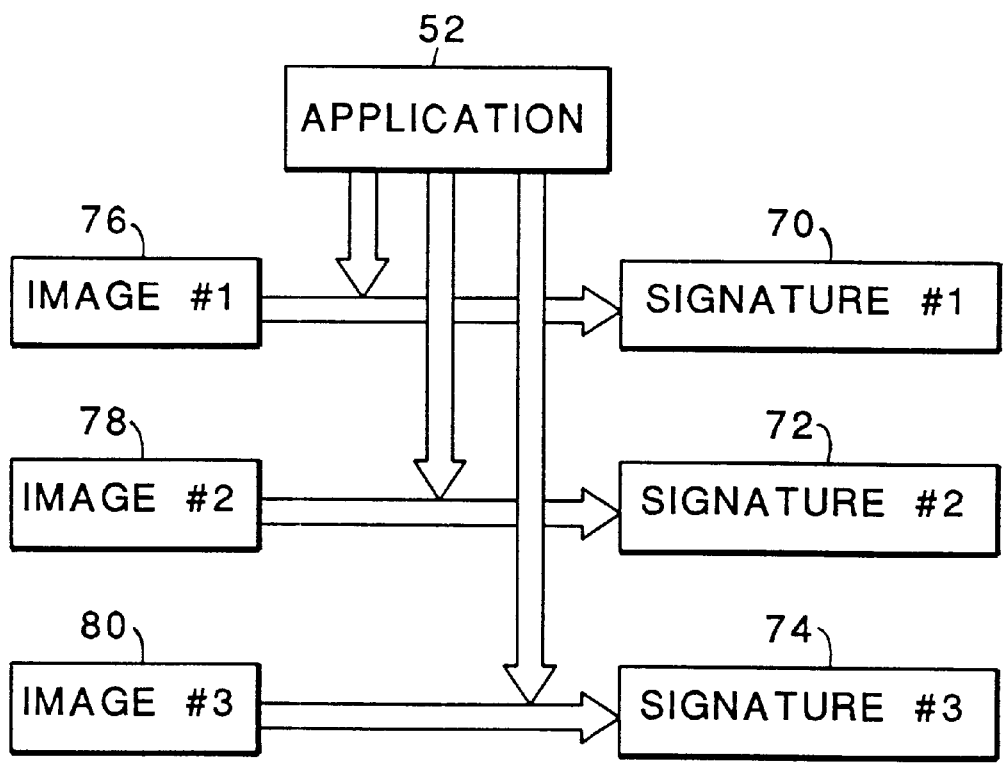
FIG. 10 depicts creation of unique signatures for the images.

The unique identifier used by the application to determine whether the application is allowed to process the image can be created in a number of different ways. One method is to use a random number generator started with a seed that is specific to the particular image. For example, the seed could be arbitrary and assigned to the image or could be a particular pixel of the image. The random number generator generates numbers which select or indicate an arbitrary number of pixel locations within the image. Of course, the locations themselves can be in a fixed location controlled by a bit location map stored in the application instead of random, as an alternative. It is also possible that all the bits of the signature can be located at a single location within the image, such as an image edge pixel that is normally not noticed by a viewer, and the location can be fixed or random. At these locations the least significant bit (or bits) of one of the color values of the pixel can be modified so that the sequence of least significant bits produces a particular bit pattern or signature. A signature having a length of 24 bits would be appropriate although other lengths will provide adequate security. The signature itself can be a fixed constant, it can be arbitrary (for example, it can be produced by a random number generator starting with another seed particular to the application), it can be created using a fixed or variable formula, or can have some correlation with the particular image. This is illustrated in FIG. 10 where the application 52 is shown creating unique signatures 70,72 and 74 for corresponding images 76,78 and 80. The signature for each image (along with the seed or seeds if the image is not the source of the seed) can be stored in a table contained within the application. As can be seen from the above discussion the characteristics of a signature can include fixed or variable locations for the signature, fixed or variable signatures and the pixel values can be modified or unmodified. These characteristics can be mixed as desired to obtain the particular level of security that is desired by the media supplier.

After the images and application are transferred to a media, the media can be provided to a user. When the application is loaded by the user and when an original image stored on the disk is accessed 90 by the application, the application recreates 92 the signature, obtains 94 the corresponding signature from the table and compares 96 the image signature to the table signature. If the there is a match the application enables 98 the processing of the image and if not provides a message to the user and does not allow 100 the image to be processed by the application.

Figure 11:
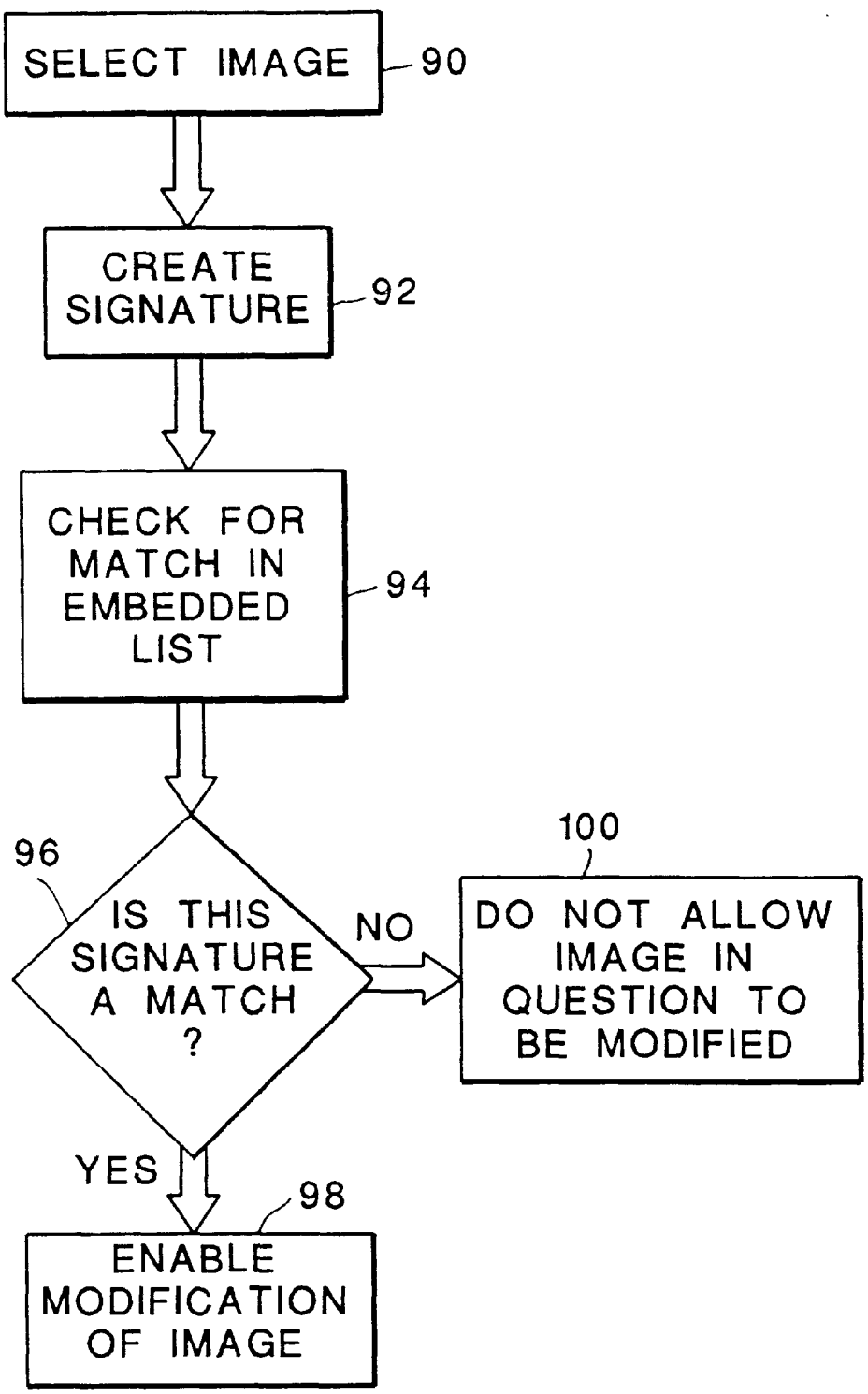
FIG. 11 is a flow chart of the signature checking process.
Figure 12:
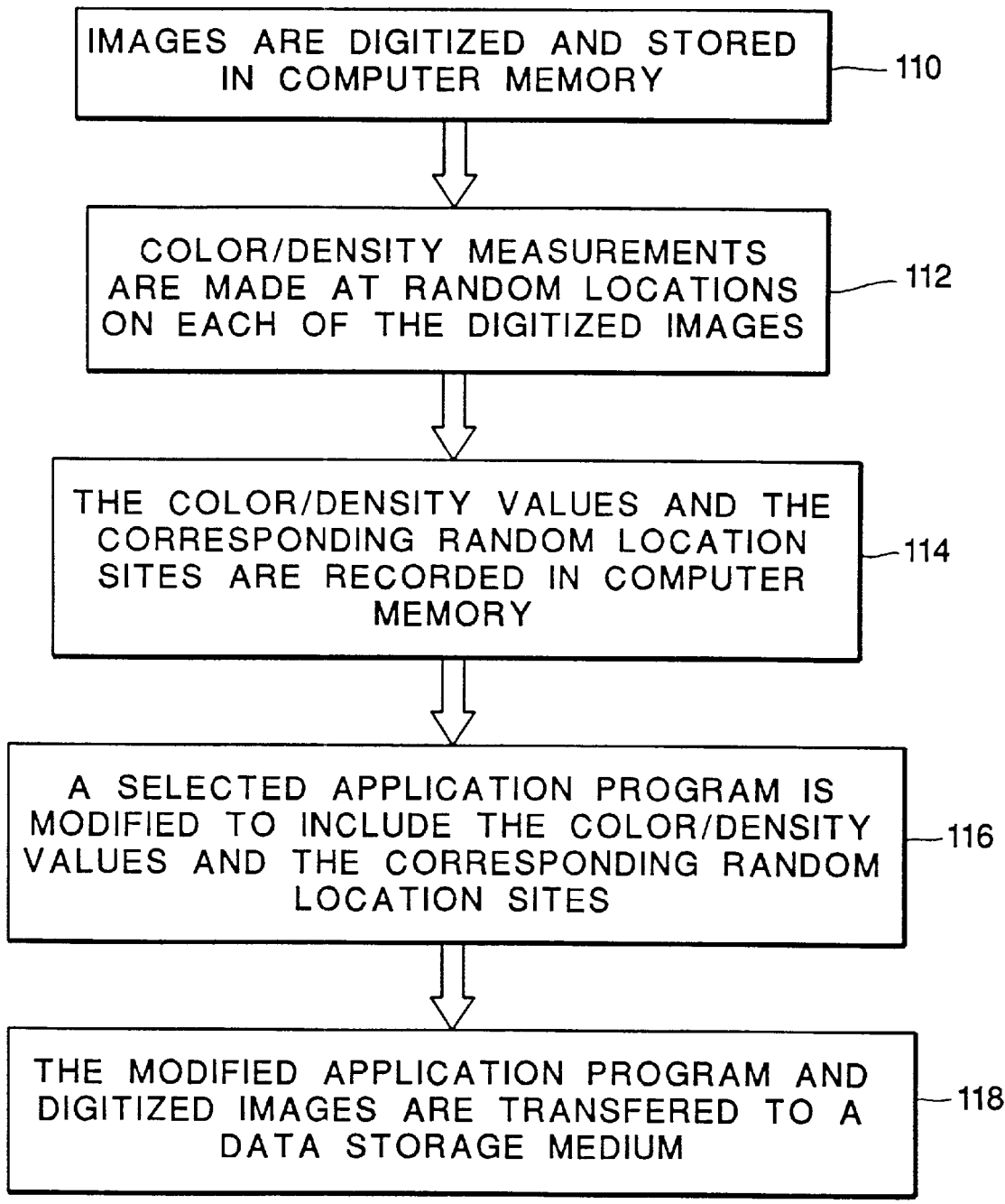
FIG. 12 depicts creation of an application with embedded color/density image signatures.

Another and preferred method of creating unique signatures using the characteristics of the stored images and modifying the application to include those signatures is illustrated in FIG. 12. This approach performs conventional color and density measurements to create the signature. First, the images from the original source media, such as snapshot negatives, are digitized 110 using a conventional digitization process like that used in PhotoCD™. Color and density value measurements of each of the images are made 112 at random locations, as previously discussed. Then, the location sites and the values are recorded 114. Once recorded, the application, which includes a signature check process like that of FIG. 11, is modified 116, such as by loading the table previously mentioned with the site or location designation information and the values. The modified application and the digitized images are then both transferred 118 to the final destination media, such as a magnetic disk or CD ROM. This media can then be supplied to the user as previously discussed.

Figure 13:
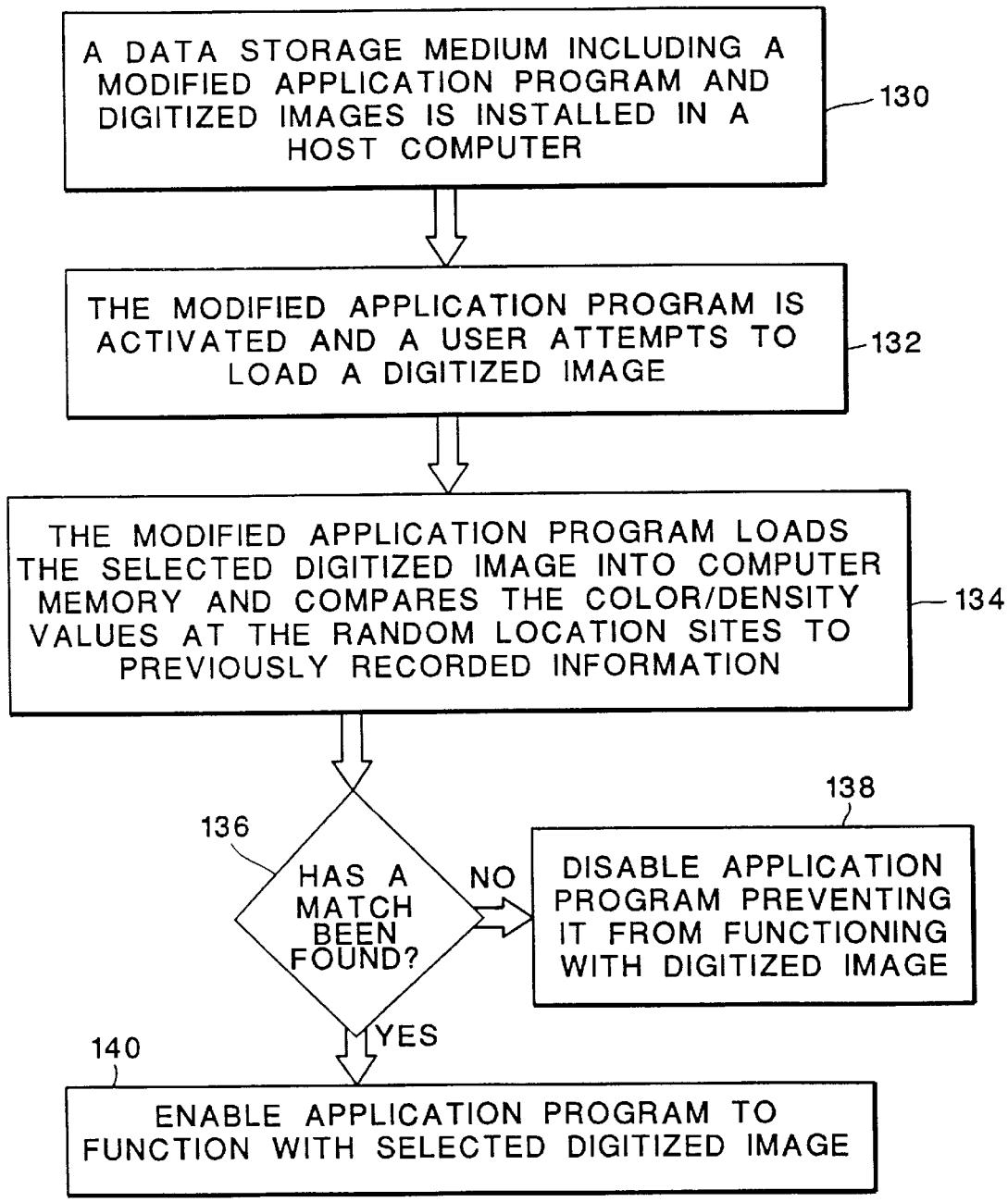
FIG. 13 depicts signature checking with image color/density signatures.

When the user receives the media with the images having the preferred signatures, the user as illustrated in FIG. 13, conventionally installs 130 the application and the images on the users computer system. The modified application is then activated 132 by the user and the user attempts to load 134 a digitized image. The modified application retrieves 134 the selected image into computer memory (RAM) and compares the color/density values at the designated image locations with those in the table. The application then determines 136 whether a match has resulted, if not the application program is conventionally disabled by prohibiting reading or prohibiting functioning of the application. If a match has occurred the application program is enabled for all of its functions for the particular image that is currently stored in the computer memory. When the signature is based on image color or density and when the bits are randomly scattered throughout the image, any modifications to the image whether global or regional will likely modify one or more of the signature bits and result in a signature that does not match any of those found in the application.

The present invention has been described with respect to limiting an application to processing images on the same media as the application by providing a unique signature recognizable by the application in each image. There are other more or less sophisticated ways of providing this limitation. For example, the application can be limited to processing images from the same source. The source could have an identifier that is checked to determine whether it is a legitimate source. Each image could have an identifier provided in the header for the image file. The header would be checked for a match during image retrieval and loading. The images can all be encrypted using a unique encryption code for each image where the application includes the code and a decryption process. The application can be executed within a specially created image processing shell or environment that includes the images from the media where the shell would be modified to not allow images to be processed or imported from outside the shell. The signature embedded within each image could be encrypted. The signature can be created from other characteristics of the image, such as a color frequency or density histogram or by counting color step size changes within an image. A signature could also be a fractal created from the image. Hashing functions as well as error check codes could also be used to create the signatures. As can be seen any information that can be used to uniquely identify an image can be used as a signature. These signatures fall into two classes: 1) self-generated where the image content itself provides the signature; and 2) added or embedded where the signature is not related to the image content. The location of the signatures can fall into three classes: A) fixed where the signature bits are in locations controlled by one or more bit location maps; B) random where the bit locations are controlled by a random number generator seeded with a seed unique for the media, source or image; and C) algorithmic where a formula or algorithm controls where the bits are located.

When both specific customer image files and/or customer selected image files and image manipulation applications or files are delivered to the customer on the same storage/delivery means, the customer may be provided with an incentive to use the delivered application to modify the images. Additionally, the application may show the customer that advantageous manipulations are possible with the "co-stored" image files, and that further high resolution printing of modified images which can be accomplished by the service provider, such as in a specialized print shop, may be desired. As previously discussed, the application can be delivered in a condition allowing printing of the image on the users printer which is generally low resolution when the user is the typical consumer. As previously mentioned, with respect to FIG. 9, the application can be configured such that the modifications can only be printed by the service provider, such as the photo shop, so that additional business can be directed to the service provider.

As previously discussed, a customer desiring digitization of personal images would also receive image manipulation or enhancement applications on the same storage and delivery means. These applications may be specified by the user. For example, if the customer has provided images for use in creating the family Christmas card, the customer might select an application with the purpose of creating greeting cards. Similarly, if the customer wished to restore an heirloom image, the customer might select an application with the purpose of image restoration. This flexibility offers the customer the ability to get exactly what is needed to achieve the desired end result. Another example is that of personalized screen-savers for the customer's computer. In addition to digitizing personal images in formats for use in other commercially available screen-savers, a service provider might include a screen-saving application along with the digitized personal images on the same storage means. The customer could then use their personal customized snapshots as screen saver images.

The service provider might also include other applications on the media at the provider's discretion. Such applications may automatically show the customer image augmentation operations which the customer may desire. Such a situation could result in additional business for the service provider.

As an alternative to providing fully functional applications, the included applications may not be rendered completely functional. For example, the "save" or "print" functions, as previously discussed, of the application might not be operative. Thus, the customer could see what might be possible, yet be unable to realize these possibilities without using another application or returning to the service provider for printing. In such a situation, the "script" or "job file" would be saved on the basis of customer initiated manipulations. Such files would enable the customer to return to the service provider with a set of instructions which would yield the desired result. If the application is not provided with a script interpreter, the customer would not be able to create the desired print without the necessary interpreting and printing means. These scripts or job files could be stored on the image/application delivery and storage means, or on some other storage means if the image/application storage means is full with data or not customer writable.

Another manner in which the application might be rendered less than fully functional would be to limit the size of the data file on which it could operate. For example, if the application will only operate at screen resolution, any resulting saved files would have limited use beyond indicating the effects of manipulations. Also, a subset of colors desired in printing might be used instead of the full color palate of the final printed file. For example, if the application delivered with the image files was designed to insert customer images into professionally prepared templates, the templates might be available only as 8-bit resolution or less representations of the actual template files for printing. The full resolution print files would reside with the service provider, and the customer could get the desired print of his images in the template file from the service provider.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List

10,20 Application medium
12,22,24 Image medium
14,40 Application and image medium
18,42 Computer system
52 Application
54 New image
56 Print,view and/or store operation
60 Script file
64 New image created by script file
66 Save restricted application
68 New image that can only be displayed
70,72,74 Image signature
77,78,80 Image
90–140 Process steps

What is claimed is:

1. A system comprising:

a computer;

a storage medium including image data of a plurality of images, each of the images including a unique signature, related to an image content of the image, comprising bits stored at known locations within each image; and an application program executable by said computer, said application program including a corresponding signature for each of the images;

wherein said application program controls the operation of said computer to perform image alteration operations only on images which have signatures matching the corresponding signatures.

2. A system as recited in claim 1, wherein said application program is included on said storage medium.

3. A system as recited in claim 2, wherein image modification modifies the signatures.

4. A storage device comprising:

a storage medium;

image data accessible by a user and stored on said storage medium; and an application program stored on said storage medium, said application program is executable by a computer only with said data stored on said storage medium, wherein said image data includes plural images each having a unique signature, said application program includes corresponding signatures and said application program controls the operation of a computer, when executed by the computer, to process only images having unique signatures that match said corresponding signatures.

5. A device as recited in claim 4, wherein said application program is restricted to controlling the operation of a computer to perform image processing applications on image data solely from said storage medium.

6. A device as recited in claim 4, wherein said unique signatures include color and density information from random locations within the images.

7. A device as recited in claim 4, wherein said application program is limited to controlling the operation of a computer to perform display output operations.

* * * * *